June 14, 1966 P. BRADFORD 3,256,097
METHOD FOR PUMPING A MEAT EMULSION
Original Filed Feb. 14, 1961
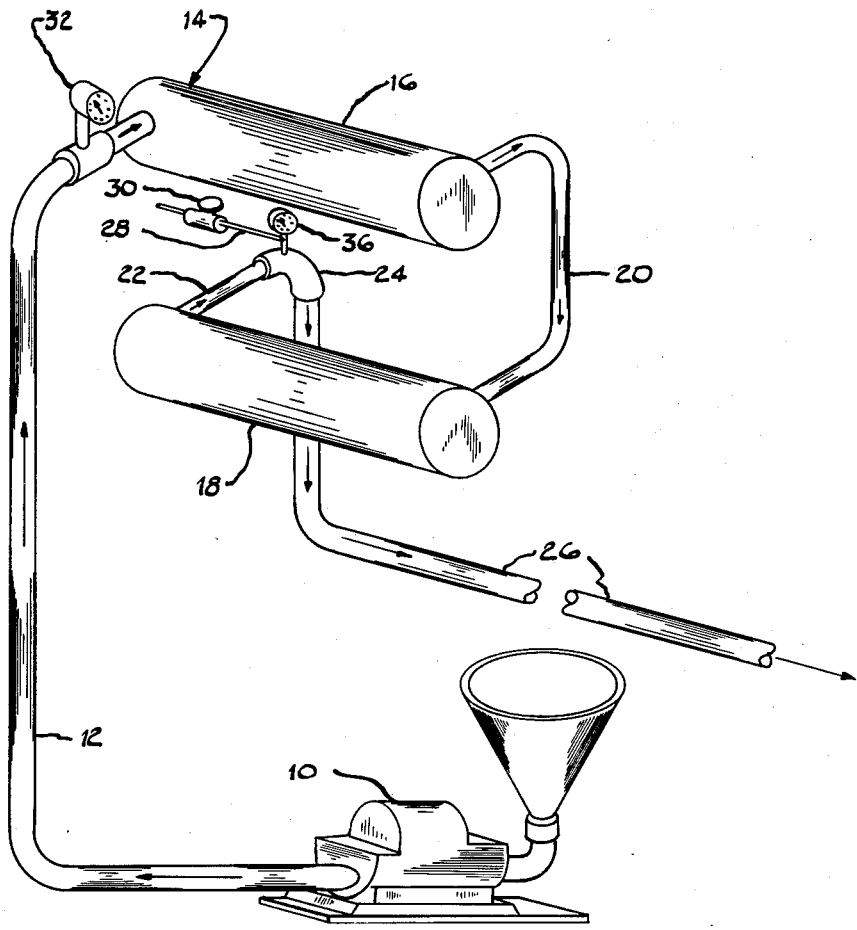
PURDY BRADFORD
INVENTOR.
BY Ray G. Story
ATTORNEY

3,256,097
METHOD FOR PUMPING A MEAT EMULSION
Purdy Bradford, Palos Park, Ill., assignor to Swift & Company, Chicago, Ill., a corporation of Illinois
Continuation of application Ser. No. 89,207, Feb. 14, 1961. This application Oct. 23, 1964, Ser. No. 407,279
1 Claim. (Cl. 99—108)

This is a continuation of application, Serial No. 89,207, filed February 14, 1961, now abandoned.

This invention relates to an improved method for pumping emulsions; and more specifically relates to an improved method for pumping meat emulsions, such as a meat emulsion comprising a mixture of protein and fatty materials.

Prior to this invention cohesive mixtures or emulsions have usually been transported in bulk carriers. For instance, in the packing industry protein material is usually extracted during a fat rendering process in the form of a cohesive mass of particles in mixture with a substantial portion of fatty material. In the industry this mixture is commonly regarded as an emulsion. At the time of extraction, the mixture of protein and fatty materials is relatively warm and it is usually desirable to chill it as quickly as possible before storing. Heretofore, it has been necessary to collect the material in bulk lots and transfer it in vessels between the various processing operations and storage. This is particularly so after the material has been chilled and displays a consistency comparable to that of chilled hamburger.

Accordingly, it is a principal object of this invention to provide an improved method for transporting a cohesive meat emulsion.

It is another object of this invention to provide an improved method which enables the pumping of a cohesive mixture comprising protein and fatty materials.

It is a further object of this invention to provide an improved method of pumping meat emulsion.

It is still another object of this invention to provide an improved method enabling the pumping of a mixture of extracted protein and fatty material as an adjunct to a rendering operation.

The pumping of distinctly particulate solids materials, as contrasted to fluids, has long been possible through a process of fluidization wherein a fluid, such as air, is intimately mixed with a particulate material to impart thereto certain flow characteristics of fluids in general. However, according to this well-known practice, the discrete particles have been noncohesive in nature, and the injected fluid entirely envelops and effectively separates each particle. It is not believed that the practice of injecting a fluid into a mass of cohesive particles has ever been attempted or even been suggested, primarily because the nature of such particles does not admit to being enveloped by fluid or to be fluidized thereby.

My invention, however, comprises a new use based upon this principle, whereby in pumping a meat emulsion through a long pipeline, a gas is continuously injected into the pipeline at the inlet end thereof to facilitate the movement of the material therethrough.

One embodiment of the apparatus for carrying out my invention has been illustrated in the accompanying drawing, but it is to be expressly understood that said drawing is for the purpose of illustration only and is not to be taken as a definition of the limits of the invention, reference being had to the appended claim for this purpose.

In the practice of my invention a suitable mixture of cohesive particles comprising a viscous emulsion is forced under pressure through a pipeline towards its discharge end. A gas under pressure is injected into the pipeline at its inlet end. The gas as injected downstream of a pump or any other equipment such as a heat exchanger which treats the emulsion and in which presence of gas in the emulsion would hinder the treatment.

Air, for obvious reasons, is a preferable gas for injection; however, it would also be obvious that an inert gas, such as nitrogen or carbon dioxide may be more desirable when handling certain materials. I have found that a preferable ratio of gas to emulsion is in the range of .25 cubic feet to .34 cubic feet of gas per pound of material.

Observation of this process indicates that the amount of pressure required to force material through a given pipeline is drastically reduced from that required when no gas is injected. Also, observation indicates that such material is discharged from the pipeline in slugs and spurts but at a very satisfactory rate of flow. These observations also indicate that the gas is not substantially intermixed with the particles of such cohesive material. It is believed that injected gas tends to hold the slugs away from the wall of the pipeline and serves substantially as a lubricant for slugs of emulsions. The single drawing represents the apparatus for carrying out the invention.

In the illustrated installation, adjunct to a rendering operation, an extracted mixture of protein and fat is forced by a Waukesha pump 10 at about 115° F. through a 2-inch inside diameter conduit 12. The conduit 12 leads into a chilling means, generally 14 comprising a pair of chambers 16, 18 wherein the material is exposed to cold surfaces to thereby remove heat. Preferably, the chilling means is of a scraping blade type and the chambers are connected together serially by an interconnecting conduit 20. A suitable apparatus is commercially available. The second chamber 18 is in turn connected by a section of 2-inch inside diameter conduit 22 to a reducing elbow 24. From the elbow 24 a long run of 3-inch inside diameter of pipeline 26 extends approximately 70 feet, to a low temperature storage chamber (not shown). Air injecting means comprising a ¼-inch tube 28 is connected between the reducing elbow 24 and a source of air under pressure (not shown). A needle valve 30 is located in tube 28 to allow control of the gas flow. Pressure gauges 32 and 36 are located in conduit 12 adjacent to cooling chamber 16 and in the air tube 28 respectively.

A rate of approximately 700 pounds per hour of meat emulsion containing approximately 30% fat was maintained in the above apparatus, and chilled to about 40° F. when passing through the chilling means 14. Approximately 3–4 cubic feet per minute of air at 10–15 p.s.i.g. was injected into the chilled emulsion at the inlet end of pipeline 26, at elbow 24. The specific gravity of the emulsion at the pump 10 was observed to be .7835 and was also observed at the discharge end of a pipeline 26 to be .7827, indicating no substantial change such as might be expected if air enveloped individual emulsion particles, or was otherwise entrained.

Under the above conditions it was found that a pressure of 30–40 p.s.i.g. (measured at gauge 32) was sufficient to propel emulsion at the aforementioned rate through a 70-foot pipeline 26. Without the injection of air at elbow 24 a pressure above 180 p.s.i.g. was required to force emulsion through the same distance.

Obviously, many modifications and variations of the invention as hereinbefore set forth may be made without departing from the spirit and scope thereof, and therefore only such limitations should be imposed as are indicated in the appended claim.

I claim:

An improved method for pumping a meat emulsion, said method comprising: pumping said meat emulsion at a temperature of about 115° F. from a given point under pressure through conduit means into the inlet end of a pipeline; cooling said meat emulsion to a temperature of about 40° F. while being pumped through said conduit means; and injecting a gas selected from the group consisting of air, nitrogen, and carbon dioxide in the ratio of about .25 ft.$^3$ to .34 ft.$^3$ per pound of said meat emulsion into said pipeline at the inlet end thereof, whereby the amount of force necessary to propel said emulsion through said pipeline will be substantially reduced.

References Cited by the Examiner

UNITED STATES PATENTS

| | | | |
|---|---|---|---|
| 2,874,054 | 2/1959 | Kircher et al. | 99—109 |
| 2,907,662 | 10/1959 | Covey | 99—109 X |
| 3,095,120 | 6/1963 | Steiner et al. | 99—108 X |

FOREIGN PATENTS 159,432  4/1952  Australia.

A. LOUIS MONACELL, *Primary Examiner.*

HYMAN LORD, *Examiner.*